United States Patent
Knoerrchen et al.

(10) Patent No.: US 8,298,018 B2
(45) Date of Patent: Oct. 30, 2012

(54) CROSS CONNECTION LINK FOR SWITCHING DEVICES MODULARLY CONNECTED ON A SUPPORT MEMBER

(75) Inventors: Oliver Knoerrchen, Cologne (DE); Stephan Stanke, Rheinback (DE); Jan Karol Nowak, Euskirchen (DE)

(73) Assignee: Eaton Industries GmbH, Bonn (DE)

( * ) Notice: Subject to any disclaimer, the term of this patent is extended or adjusted under 35 U.S.C. 154(b) by 0 days.

(21) Appl. No.: 12/780,039

(22) Filed: May 14, 2010

(65) Prior Publication Data

US 2010/0291807 A1    Nov. 18, 2010

(30) Foreign Application Priority Data

May 15, 2009  (DE) .................. 10 2009 021 461

(51) Int. Cl.
 *H01R 9/26* (2006.01)
(52) U.S. Cl. ........................ 439/716; 439/511
(58) Field of Classification Search .............. 439/510, 439/511, 532, 715, 716
See application file for complete search history.

(56) References Cited

U.S. PATENT DOCUMENTS

| | | | |
|---|---|---|---|
| 7,173,809 B2 | 2/2007 | Bauer et al. | |
| 7,753,739 B2 * | 7/2010 | Bentler et al. | 439/709 |
| 2005/0013074 A1 | 1/2005 | Bauer et al. | |
| 2007/0290778 A1 * | 12/2007 | Stanke et al. | 335/202 |
| 2009/0109606 A1 | 4/2009 | Brutsch | |

FOREIGN PATENT DOCUMENTS

DE    10156214 B4    4/2006

OTHER PUBLICATIONS

European Search Report of EP 10 00 4629, dated Jul. 19, 2010.

* cited by examiner

*Primary Examiner* — Khiem Nguyen
(74) *Attorney, Agent, or Firm* — Leydig, Voit & Mayer, Ltd.

(57) ABSTRACT

A multi-phase cross connection link for carrying potential between at least two switching devices modularly connected on a support member, each switching device having connector holders for accepting the potential, includes a conductor rail associated with each phase and disposed in a housing, the housing being made of insulation material and extending in a lengthwise direction. A plurality of tabs is associated with the conductor rail, the tabs extending outward in a comb-like manner in a shared plane perpendicular to the lengthwise direction of the housing. The plurality of tabs is arranged next to each other in a sequence having a row distance that corresponds to a first grid distance of the connector holders of the switching device. At least one end, relative to the lengthwise extending, of the cross connection link has incoming contact openings leading to the conductor rail.

9 Claims, 3 Drawing Sheets

CROSS CONNECTION LINK FOR SWITCHING DEVICES MODULARLY CONNECTED ON A SUPPORT MEMBER

CROSS-REFERENCE TO RELATED APPLICATIONS

This application claims the benefit of priority under 35 U.S.C. 119 (b) to a German Application No. 10 2009 021 461.5 filed May 15, 2009.

FIELD

The invention relates to multi-phase cross connection links for carrying potential between at least two switching devices modularly connected on a support member.

BACKGROUND

German patent application 10156214 B4 relates to a busbar system consisting of at least two cross connection links (busbar blocks). The cross connection links are electrically contacted to each other by connection modules. Fixed feed terminals are present on a cross connection link (busbar block).

SUMMARY

In an embodiment, the present invention provides a multi-phase cross connection link for carrying potential between at least two switching devices modularly connected on a support member, each switching device having connector holders for accepting the potential. The multi-phase cross connection link includes a conductor rail associated with each phase and disposed in a housing, the housing being made of insulation material and extending in a lengthwise direction. A plurality of tabs is associated with the conductor rail, the tabs extending outward in a comb-like manner in a shared plane perpendicular to the lengthwise direction of the housing. The plurality of tabs is arranged next to each other in a sequence having a row distance that corresponds to a first grid distance of the connector holders of the switching device. At least one end, relative to the lengthwise extending, of the cross connection link has incoming contact openings leading to the conductor rail.

BRIEF DESCRIPTION OF THE DRAWINGS

Additional details and advantages of the invention ensue from the embodiments below, which are explained with reference to figures. The following is shown.

DETAILED DESCRIPTION

Figures 1A, 1B:
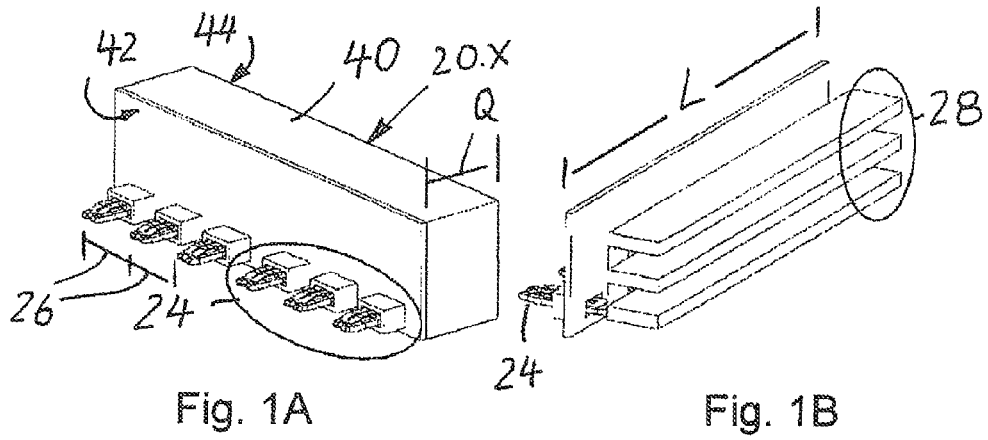
FIGS. 1A and 1B show a cross connection link (Type I) in two views.

Embodiments of the invention are based on a system of pluggable cross connection links for carrying potential between switching devices, whereby said system can be used variably for different modularly connected switching devices.

An embodiment of the invention includes multi-phase cross connection links for carrying potential between at least two switching devices modularly connected on a support member, said switching devices having connector holders for feeding in the potential, whereby the cross connection links comprise at least:

a conductor rail that is present for each phase and that is arranged in a housing made of insulation material and extending lengthwise, and each conductor rail has its own tabs that extend outward like a comb in a shared plane perpendicular to the lengthwise extension of the housing made of insulation material, and that are arranged next to each other in a sequence whose row distance corresponds to a first grid distance of the connector holders of the switching devices that can be modularly connected next to each other on the support member, and at least one end in the lengthwise extension of the cross connection links has incoming contact openings leading to the conductor rails.

The number of possible switching devices that can be modularly connected next to each other and supplied with power is limited by the permissible total current for which a cross connection link system is dimensioned. In existing cross connection link arrangements, the current carrying capacity is determined by the conductor cross sections of the stranded conductors used there. In embodiments of the present invention, on the other hand, the cross connection links are configured with conductor rails having large conductor cross sections (instead of with stranded conductors). Therefore, the permissible total current—and thus the number of possible modular connections—are increased.

The connector holders on the switching devices are configured on outgoing terminals of the switching devices, which are arranged electrically parallel to a screw contact input of the switching device. By contrast, in existing switching devices, outgoing terminals lead from a screw contact input to the switching apparatus of the switching device.

In an embodiment of the present invention, the housing made of insulation material is configured like a box, with a lengthwise extension parallel to the line-up of the switching devices, so that they are parallel to a support member (for example, a top-hat rail) on which the switching devices can be lined up. The front of the housing made of insulation material is considered to be the surface from which the tabs—situated in one plane—protrude. When it is in the installed state in the switching devices, this front faces the switching devices. The back is considered to be the housing surface that is opposite from the front and that comes to be parallel to the operating front of the switching devices.

The incoming contact openings leading to the conductor rails are located on the back. If the incoming contact openings are not being used, they can be covered up. In any case, openings on the cross connection links should be configured so that they can be covered with finger guards.

The conductor rails are arranged as flat rails in three planes in the housing made of insulation material, whereby the planes are parallel to the plane in which the tabs protrude from the housing made of insulation material.

The ends of the conductor rails can be configured to be openly accessible in the housing made of insulation material and can be provided there with coupling sections so that the conductor rails of adjacent cross connection links engage together and contact each other electrically.

Accordingly, there are at least two suitable types (Type I and Type II) of cross connection links. On both ends in its lengthwise extension, a cross connection link of Type I has incoming contact openings leading to the conductor rails on the back of the housing made of insulation material.

At a first end in its lengthwise extension, a cross connection link of Type II (second variant) has incoming contact openings leading to the conductor rails on the back and, at the second end in its lengthwise extension, it is provided with a second coupling section. This coupling section can be openly accessible either towards the back or towards the front of the housing made of insulation material. Another cross connection link that matches Type II of the second variant has a first coupling section on its first end, so that the conductor rails of the adjacent first and second cross connection links engage together and can contact each other electrically.

The open configurations of the coupling sections (either towards the back or towards the front of the housing made of insulation material) can be closed with a covering cap.

Three tabs (per pole) protrude from the conductor rails for each switching device input. The tabs are arranged in one plane, and this plane corresponds to the line-up of the connector openings on the switching devices.

Depending on the requirements and configuration of the switching devices, the tabs can be designed as round connectors, flat connectors or tulip connectors.

Preferably, the cross connection links should be configured with three poles.

FIG. 1 shows two views of a first type (Type I) of three-pole cross connection links 20.X for carrying potential and for bridging the potential for two switching devices modularly connected on a support member. FIG. 1A shows a cross connection link in a view of its front 42 on which a row of tabs 24 are configured (comb-like) in one plane. For each switching device input, there are three protruding tabs 24 (per phase). The tabs 24 have a (first) grid distance 26 that corresponds to the grid distance of connector holders 14 configured on the switching devices 10 (see FIG. 5). FIG. 1B shows an opened, box-like housing 40 of insulation material of a cross connection link in which three conductor rails 28 configured as flat rails can be seen, which are parallel to each other in three planes that are parallel to the plane that is formed by the tabs 24. An electric connection goes from each conductor rail that establishes a phase to the tabs. The length L of a housing made of insulation material depends on the number of tabs 24. The crosswise dimension Q is uniform for all of the cross connection links. The tabs 24 are configured as flat connectors in the figures; however, they can also have a different shape that matches the connector holders 14 of the switching devices.

Figure 2:
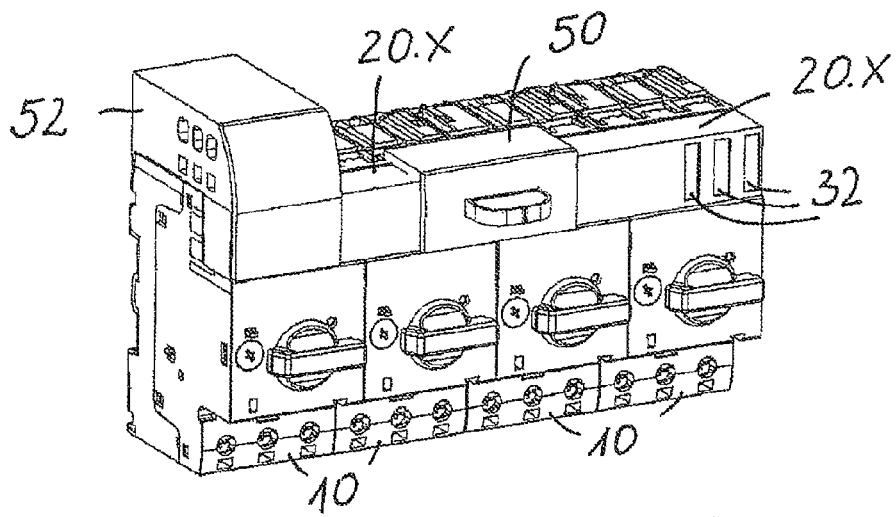
FIG. 2 depicts three switching devices with two cross connection links (Type I)
Figure 4:
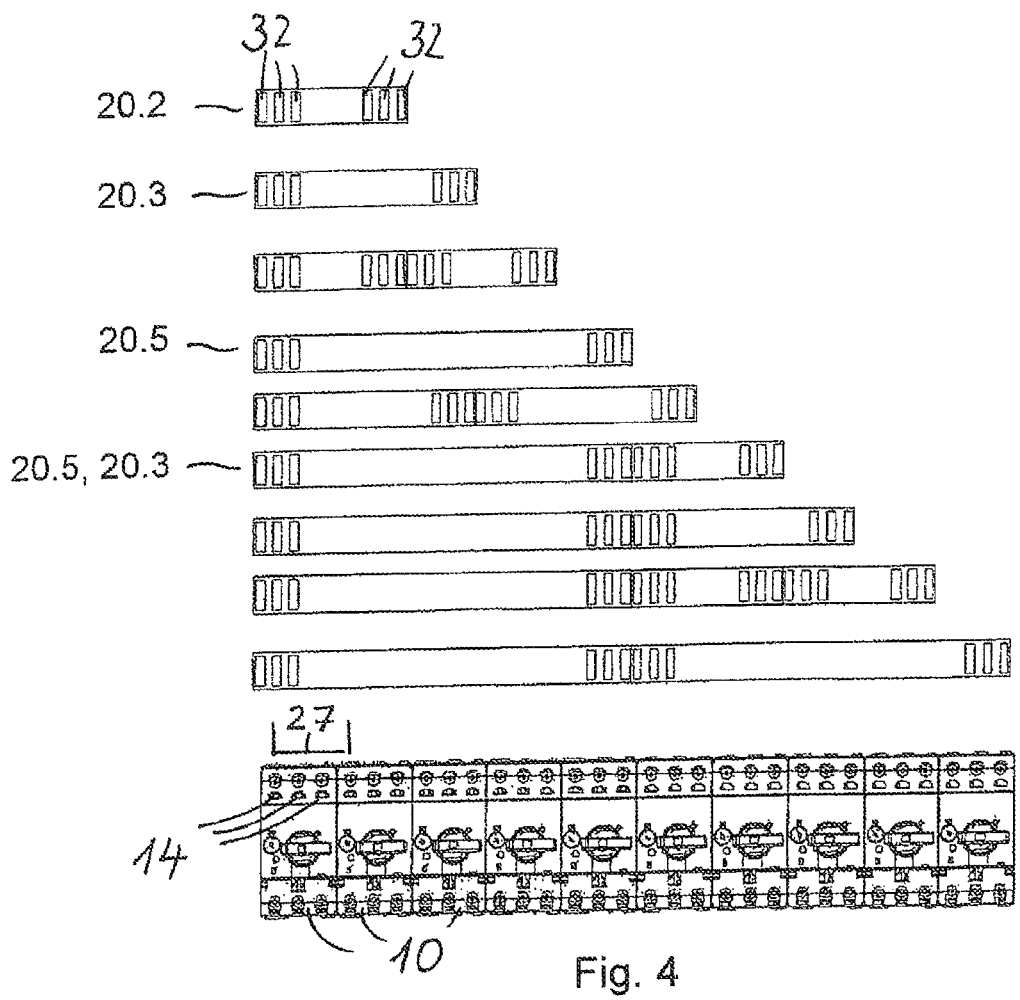
FIG. 4 depicts ten modularly connected switching devices with different cross connection links (Type I)

FIG. 2 shows four switching devices 10 on whose feed sides two cross connection links 20.X (likewise Type I) have been installed. On the switching devices 10, there are connector holders 14—see FIG. 5—that cannot be seen in FIG. 2 since they are covered up by the installed cross connection links. On the left in FIG. 2, a feed module 52 is installed onto the first cross connection link and this feed module 52 serves to feed potential from the power supply system. A connector module 50 is installed between the two cross connection links and it is configured to bridge potential from the first to the second cross connection link. On the back 44 of the cross connection link—that is to say, towards the front in the figure—there are incoming contact openings 32 of which three incoming contact openings 32 are visible on the right-hand cross connection link of FIG. 2. It should be possible to close these incoming contact openings, for example, by means of a slide. Reference is hereby also made to FIG. 4 for a further description of the cross connection links of Type I.

Figure 3:
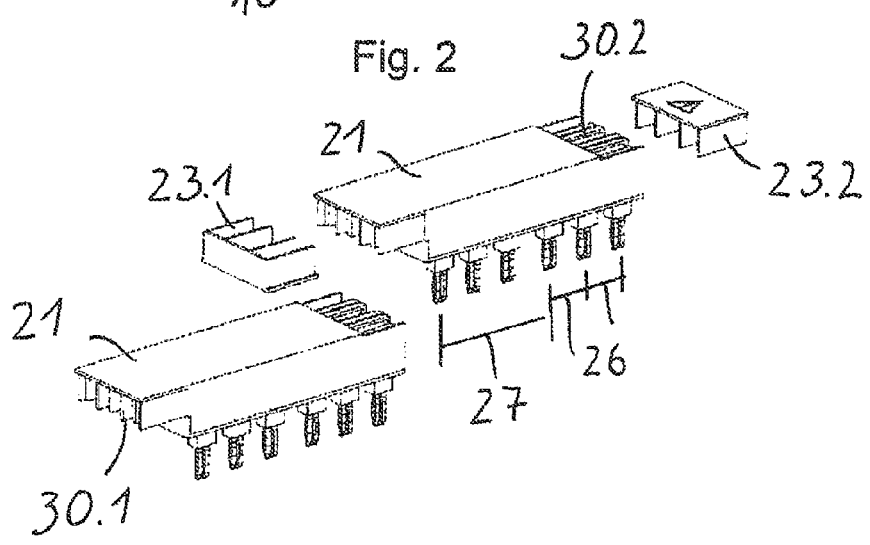
FIG. 3 shows a cross connection link (Type II), open at the ends, with coupling sections.

FIG. 3 shows a second type (Type II—first variant) of a cross connection link 21, whereby the ends of the conductor rails 28 are configured in the housing 40 of insulation material to be openly accessible towards the back of the housing 40 of insulation material. The ends of the conductor rails 28 are provided with coupling sections 30.1, 30.2 so that the conductor rails of adjacent cross connection links engage together and can contact each other electrically. The first end opening of the cross connection link 21 is accessible from the back 44 of the housing 40 of insulation material, whereby the second end opening is accessible from the front 42. Consequently, according to FIG. 3, this results in a plugging sequence of the cross connection links 21 of Type II from left to right, because the right-hand end opening is accessible from the outside (from the front). When an additional cross connection link 21 is connected to the coupling section 30.2, the line-up and the potential bridging extend to the next adjacent cross connection link 21.

The end openings can be closed with a covering cap 23.1, 23.2 if no provision is made for an adjacent continuation with an additional cross connection link 21.

Cross connection links of Type II (first variant) are described in FIG. 3. A second variant of Type II still deserves mention even though it is not shown in the drawing. This variant is a cross connection link by means of which the potential can be fed from the power supply system to the switching devices. The first end in the lengthwise extension L of such a cross connection link of Type II (second variant) has incoming contact openings 32 leading to the conductor rails 28, while the second end in its lengthwise extension L has a (second) coupling section 30.2. A second cross connection link 21 whose first end has a first coupling section 30.1 can then be arranged adjacently. The conductor rails of these adjacent cross connection links then engage together and contact each other electrically.

In the top part, FIG. 4 shows an arrangement of nine modular connections (line-by-line) of different cross connection links of Type I, whereby the reference numerals 20.2, 20.3 and 20.5 designate cross connection links of different lengths. The cross connection link 20.2 is intended for bridging the potential between two switching devices, the cross connection link 20.3 is intended for bridging the potential between three switching devices, and the cross connection link 20.5 is intended for bridging the potential between five switching devices. In the bottom line of the figure, ten switching devices 10 are shown next to each other which can each be coupled to each other with one of the rows of cross connection links drawn above that. Thus, for example, eight switching devices can be coupled with the line-up of the cross connection link 20.5 plus the cross connection link 20.3, and all ten switching devices can be coupled with the line-up of the cross connection link 20.5 plus the cross connection link 20.5. The incoming contact openings 32 on the cross connection links are once again visible, which are each configured on the ends in the housing made of insulation materials.

Figure 5:
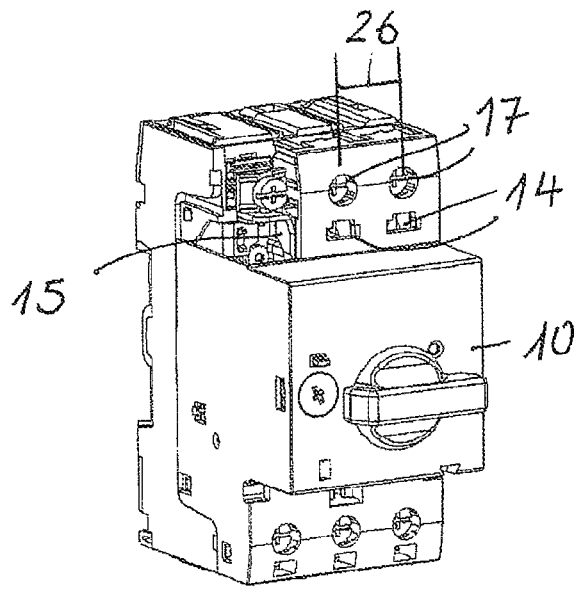
FIG. 5 shows a switching device, opened with a view of an outgoing terminal.

FIG. 5 shows a view into a switching device 10 opened at the feed contact 17. At the top, there are three screw contacts 17 next to each other. The screw contacts 17 are accessible from the top and are screwed in from the front. From these screw contacts, outgoing terminals 15 (see FIGS. 6 and 7) lead to the switching apparatus of the switching device. The connector holders 14 that are present at the grid distance 26 are configured electrically parallel to the screw contacts 17. The tabs 24 of the cross connection links are configured to match in such a way that they electrically contact the outgoing terminals 15 when they are plugged in.

Figure 6:
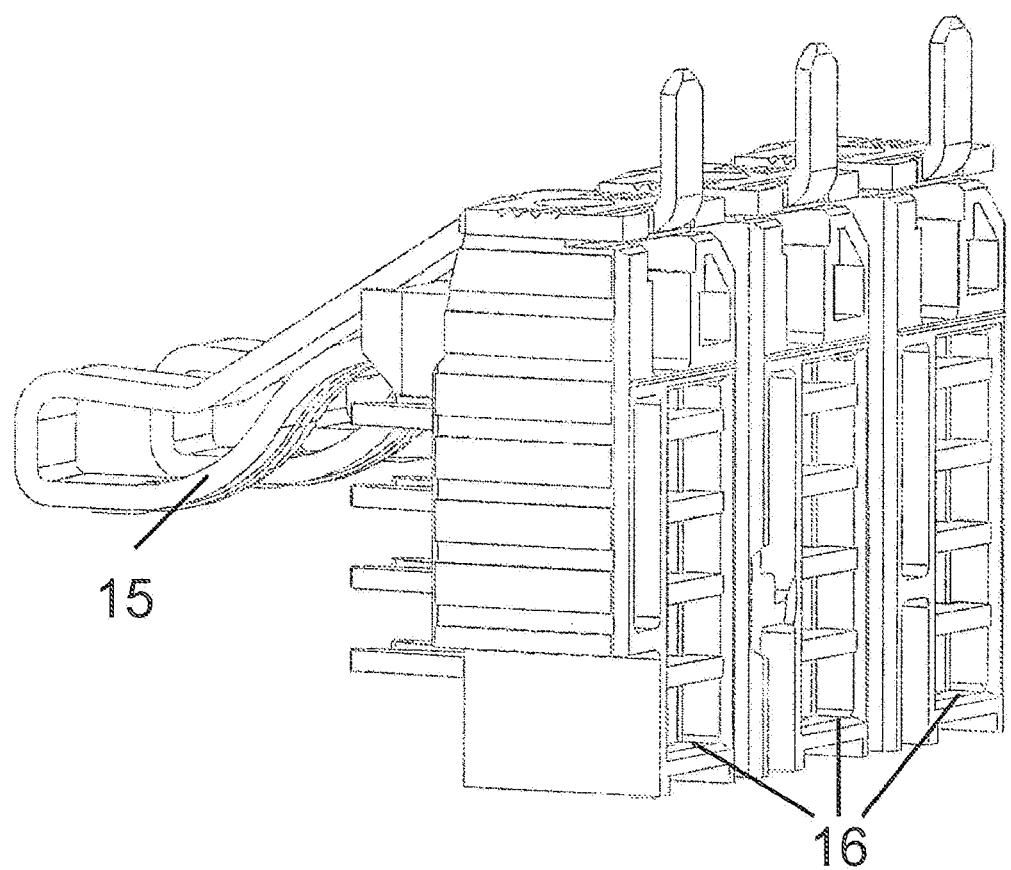
FIG. 6 shows a switching apparatus of a switching device with an outgoing terminal.
Figure 7:
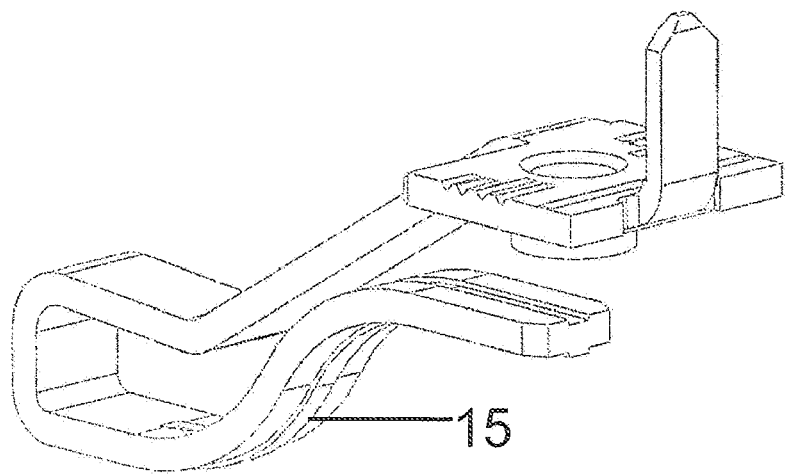
FIG. 7 shows an outgoing terminal.

Three switching apparatuses 16 of a switching device with outgoing terminals 15 are shown in FIG. 6, whereby FIG. 7 shows an outgoing terminal in a detailed drawing. The outgoing terminal has a conductor section protruding upwards, which is electrically connected to the screw contact 17.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

LIST OF REFERENCE NUMERALS 10 switching device
14 connector holder
15 outgoing terminal
16 switching apparatus
17 screw contact
20.X, 20.1, 20.2 cross connection link
21 cross connection link
23.1, 23.2 first, second covering caps
24 tab
26 first grid distance
27 second grid distance
28 conductor rail
30.1, 30.2 conductor rail coupling section
32 incoming contact opening
40 housing made of insulation material
42, 44 front, back
50 connector module (multi-pole)
52 feed module (multi-pole)
L lengthwise extension
Q crosswise extension

The invention claimed is:

1. A multi-phase cross connection link for carrying potential between at least two switching devices modularly connected on a support member, each switching device having connector holders for accepting the potential, the cross connection link comprising:
   a conductor rail associated with each phase and disposed in a housing, the housing being made of insulation material and extending lengthwise; and
   a plurality of tabs associated with the conductor rail, the tabs extending outward in a comb-like manner in a shared plane perpendicular to the lengthwise direction of the housing, the plurality of tabs being arranged next to each other in a sequence having a row distance that corresponds to a first grid distance of the connector holders of the switching device;
   wherein at least one end of the cross connection link, relative to the lengthwise extending, has incoming contact openings leading to the conductor rail,
   wherein the housing is configured as a box having a front and a back, and wherein the tabs extend from the front, and
   wherein the incoming contact openings are arranged along the back of the housing so as to allow the contact openings to be covered.

2. A multi-phase cross connection link for carrying potential between at least two switching devices modularly connected on a support member, each switching device having connector holders for accepting the potential, the cross connection link comprising:
   a conductor rail associated with each phase and disposed in a housing, the housing being made of insulation material and extending lengthwise; and
   a plurality of tabs associated with the conductor rail, the tabs extending outward in a comb-like manner in a shared plane perpendicular to the lengthwise direction of the housing, the plurality of tabs being arranged next to each other in a sequence having a row distance that corresponds to a first grid distance of the connector holders of the switching device;
   wherein at least one end of the cross connection link, relative to the lengthwise extending, has incoming contact openings leading to the conductor rail, and
   wherein the connector holders are disposed on an outgoing terminal of the switching device, the connector holders being arranged electrically parallel to a screw contact input of the switching device.

3. The cross connection link according to claim 1, further comprising coverings of the incoming contact openings that are configured as slide elements.

4. The cross connection link according to claim 1, further comprising a covering of the incoming contact openings that is configured in the form of a cap.

5. The cross connection link according to claim 1, wherein the conductor rail includes a plurality of flat rails disposed along three planes in the housing.

6. The cross connection link according to claim 1, wherein a first and a second cross connection link are provided, the first cross connection link having the incoming contact openings at a first end along the lengthwise extending and a second coupling section at a second end along the lengthwise extending, the second cross connection link having a first coupling section disposed on its first end, wherein the first and second coupling sections are configured so that conductor rails of adjacent first and second cross connection links engage together and create an electrical contact.

7. The cross connection link according to claim 6, wherein a second end of the second cross connection link further includes a third coupling section so that a conductor rail of an additional cross connection link on which a fourth coupling section is configured and which is arranged adjacent to the second cross connection link engages the conductor rail of the second cross connection link so as to create an electrical contact.

8. The cross connection link according to claim 6, further comprising covering caps configured for closing the first and second coupling sections.

9. The cross connection link according to claim 1, wherein the tabs include at least one of a round connector, a flat connector, and a tulip connector.

* * * * *